United States Patent [19]

Peer

[11] 3,978,174

[45] Aug. 31, 1976

[54] EVAPORATOR COOLER APPARATUS

[75] Inventor: Charles D. Peer, Wichita, Kans.

[73] Assignee: Great Plains Industries, Inc., Wichita, Kans.

[22] Filed: June 2, 1975

[21] Appl. No.: 582,740

Related U.S. Application Data

[63] Continuation of Ser. No. 456,822, April 1, 1974, abandoned.

[52] U.S. Cl. ........................... 261/29; 261/89; 261/DIG. 4; 98/2.14
[51] Int. Cl.² ............................................. B60H 3/04
[58] Field of Search ............... 261/29, 89, 90, 105, 261/DIG. 4; 55/230, 231, 259; 98/2.11, 2.14, 2.17; 62/310, 315

[56] References Cited
UNITED STATES PATENTS

| | | | |
|---|---|---|---|
| 2,296,155 | 9/1942 | Feinberg | 261/90 |
| 2,843,216 | 7/1958 | Powell | 55/259 |
| 3,193,261 | 7/1965 | Nesbitt | 261/89 |
| 3,273,867 | 9/1966 | Enblom | 261/105 |
| 3,348,821 | 10/1967 | Martin et al. | 55/259 |
| 3,538,657 | 11/1970 | Macrow | 261/89 |
| 3,583,174 | 6/1971 | Logue | 261/DIG. 4 |
| 3,698,158 | 10/1972 | Kinnebrew | 261/90 |
| 3,867,486 | 2/1975 | Nagele | 261/DIG. 4 |

*Primary Examiner*—Tim R. Miles
*Assistant Examiner*—Gregory N. Clements
*Attorney, Agent, or Firm*—Phillip A. Rein

[57] ABSTRACT

This invention relates to a compact evaporator cooler apparatus having a vaporizer means mounted within a housing means and a fluid supply means connected to the vaporizer means for the mixing of air and water to thoroughly saturate the air. The vaporizer means includes a power assembly having a motor member with a central shaft to drive a vaporizer disc on one end and a fan blade at the other end to achieve a thorough vaporization or fogging of water particles discharged outwardly from the vaporizer disc. The vaporizer means further includes a filter assembly having a filter member operable to filter the air therethrough and permit the cooled air to pass therethrough to the area to be conditioned.

5 Claims, 4 Drawing Figures

3,978,174

EVAPORATOR COOLER APPARATUS

This is a continuation of application Ser. No. 456,822, filed Apr. 1, 1974, now abandoned.

Numerous types of evaporator cooler structures are known in the prior art, the most common is where a fluid, such as water, is made to saturate a filter structure and, then, air flow is made to pass through the saturated filter structure to pick up the water particles and cool the air. Additionally, it is known in prior art humidifier structures that rotating discs may be utilized in order to atomize the water particles but such is not as effective and efficient evaporation as found in the applicant's invention.

In one preferred embodiment of this invention, an evaporator cooler apparatus is provided which can be readily mounted on pick-up trucks, recreational vehicles, etc. and includes a housing means having a vaporizer means therein which, in turn, is connected to a fluid supply means. The housing means includes a top housing assembly mounted on a support housing assembly and a fan housing assembly secured to the support housing assembly with all the subject housing assemblies interconnected by a connector assembly. The top housing assembly includes a cover member having integral, downwardly depending, inlet channel members on opposite sides to properly direct inlet air about the periphery of the support housing assembly. The support housing assembly includes a base housing member having a screen assembly connected thereto. The base housing member includes an irregularly shaped bottom wall having upright sidewell sections provided with air inlet openings thereabout. The fan housing assembly includes a main body section having an integral, upright spacer wall. The main body section is provided with a bottom wall having inclined sidewall portions which have a plurality of discharge openings therein. The vaporizer means includes a power assembly surrounded by a filter assembly. The power assembly includes a main drive motor member having a central drive shaft. The drive shaft has a lower end connected to a fan blade for pulling air therethrough and the upper end is connected to a circular vaporizer disc. The filter assembly includes a cylindrical filter member mounted about the power assembly with the upper surface of the filter member in close proximity to the vaporizer disc to direct air through the filter member. The fluid supply means includes a reservoir assembly, a pump assembly, and a control means. The reservoir assembly includes a water storage container with the pump assembly operable to provide water into the support housing assembly with the resultant level controlled by a float valve. The control means includes an actuator switch operable to energize a circulating pump and the motor member during operation.

One object of this invention is to provide a compact evaporator cooler apparatus being of streamlined design and lightweight construction so as to be readily mounted on the exterior of a pick-up truck, motorized home, or camper type vehicle.

Another object of this invention is to prove an evaporator cooler apparatus having a new and novel vaporizer means to receive water for efficient atomization in the inlet air before discharging to the areas to be cooled.

Another object of this invention is to provide an evaporator cooler apparatus having a housing means to enclose a vaporizer means, a fluid supply means to supply fluid to the vaporizer means, and the vaporizer means having a rapidly rotating vaporizer disc to transform fluid on the disc into a fine mist or fog for mixing with the inlet air.

One other object of this invention is to provide an evaporator cooler apparatus having a housing means enclosing mixing chamber areas to provide for mixing areas of the inlet air stream and the water in a vortex type of action.

Still, another object of this invention is to provide an evaporator cooler apparatus which is compact in structure, attractive in appearance, sturdy in construction, easy to install, and substantially maintenance free.

Various objects, advantages, and features of the invention will become apparent to those skilled in the art from the following discussion, taken in conjunction with the accompanying drawings, in which.

Figure 1:
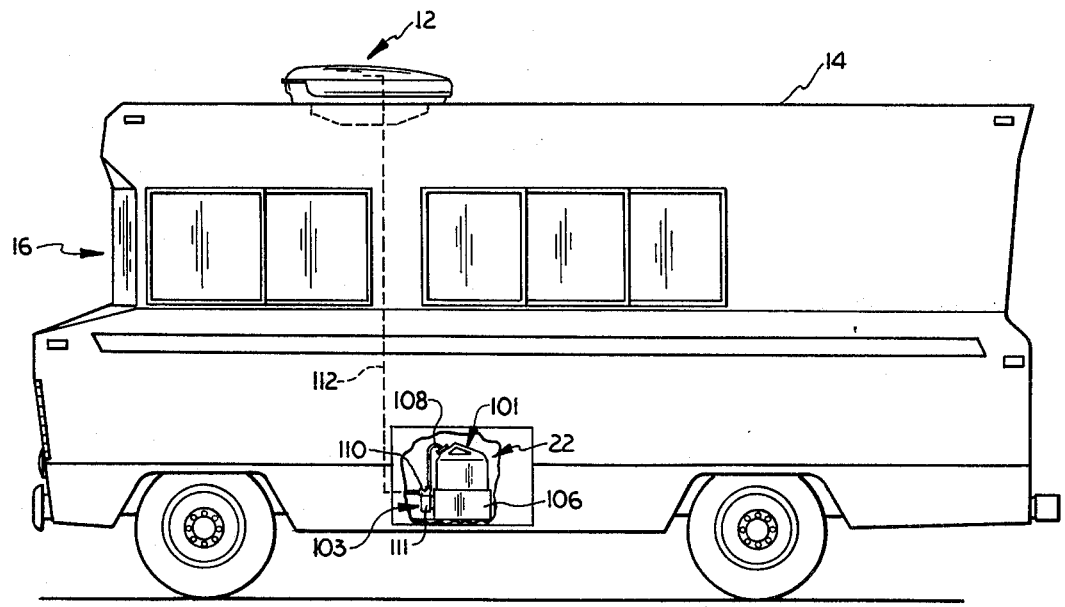
FIG. 1 is a side elevational view of a motorized recreational home vehicle having an evaporator cooler apparatus of this invention mounted thereon with portions of the vehicle broken away for clarity.

The following is a discussion and description of preferred specific embodiments of the new evaporator cooler apparatus of this invention, such being made with reference to the drawings, whereupon the same reference numerals are used to indicate the same or similar parts and/or structure. It is to be understood that such discussion and description is not to unduly limit the scope of the invention.

In one preferred embodiment of this invention as shown in FIG. 1, an evaporator cooler apparatus, indicated generally at 12, is shown as attached to a top wall 14 of a motor home vehicle 16. It is obvious that the evaporator cooler apparatus 12 can be mounted on various types of vehicles such as pick-up trucks, campers, buses, tractor cabs, etc. requiring only a fluid and power supply necessary for proper operation.

The evaporator cooler apparatus 12 includes a housing means 18 having a vaporizer means 20 mounted therein which, in turn, receives water from a fluid supply means 22. The housing means 18 includes a top housing assembly 24 mounted on an intermediate support housing assembly 26 which, in turn, has its lower portion enclosed by a fan housing assembly 28, the above combination interconnected by a connector assembly 30.

The top housing assembly 24 includes a main cover member 32 having integral, downwardly depending, inlet channel members 34 about a portion of its peripheral. The cover member 32 includes an upper arcuate ribbed top wall 35 having an integral anchor rim 36 about its peripheral edge extending in a generally horizontal plane. The anchor rim 36 has a plurality of spaced connector holes 38 therein. The ribbed top wall 35 is curved downwardly from front to rear to provide smooth air flow thereover. A circular impingement ring member 40 of a saucer shape is secured to the underside of the top wall 35 for reasons to be explained. The inlet channel members 34 are extended outwardly and downwardly from the anchor rim 36 on both sides thereof and joined by an upright rear wall 42. The channel members 34 are operable to direct the air flow about the support housing assembly 26 and force into the vehicle 16.

The support housing assembly 26 includes a main base housing member 44 having a screen assembly 46 connected thereto. The base housing member 44 includes an irregular bottom wall section 47 having integral, upright sidewall sections 49 thereabout. The bottom wall section 47 is provided with an indented reservoir portion 50 to contain fluid therein and a large central fan opening 51 having a fan guard 52 secured thereto. The fan guard 52 is of a generally cylindrical shape with its axis extended in a vertical direction and secured about its periphery as by welding to the bottom wall section 47. The upright sidewall sections 49 are provied with a plurality of cut-out portions 54 with the upper surfaces 56 in a common plane to support the cover member 32 thereon. The forward one of the sidewall sections 49 is connected to a horizontally extended guide plate 58 to aid in air flow as will be explained.

The screen assembly 46 includes a plurality of screen members 60 which are mounted against the inner surface of the upright sidewall sections 49 of the base housing member 44 about the cut-out portions 54 to prevent bugs and the like from entering during operation.

Figure 2:
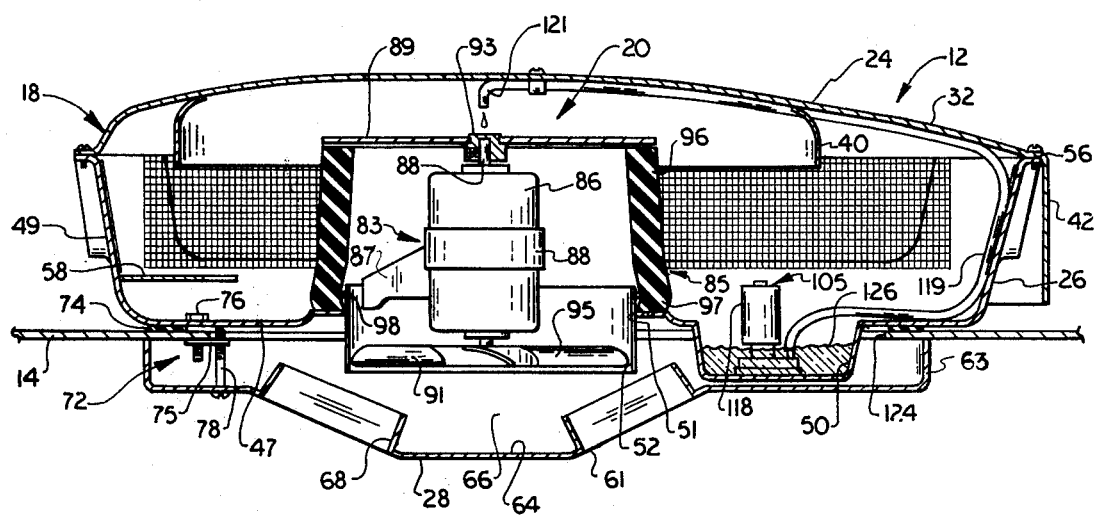
FIG. 2 is an enlarged fragmentary sectional view of the evaporator cooler apparatus mounted on the recreational vehicle as shown in FIG. 1.
Figure 3:
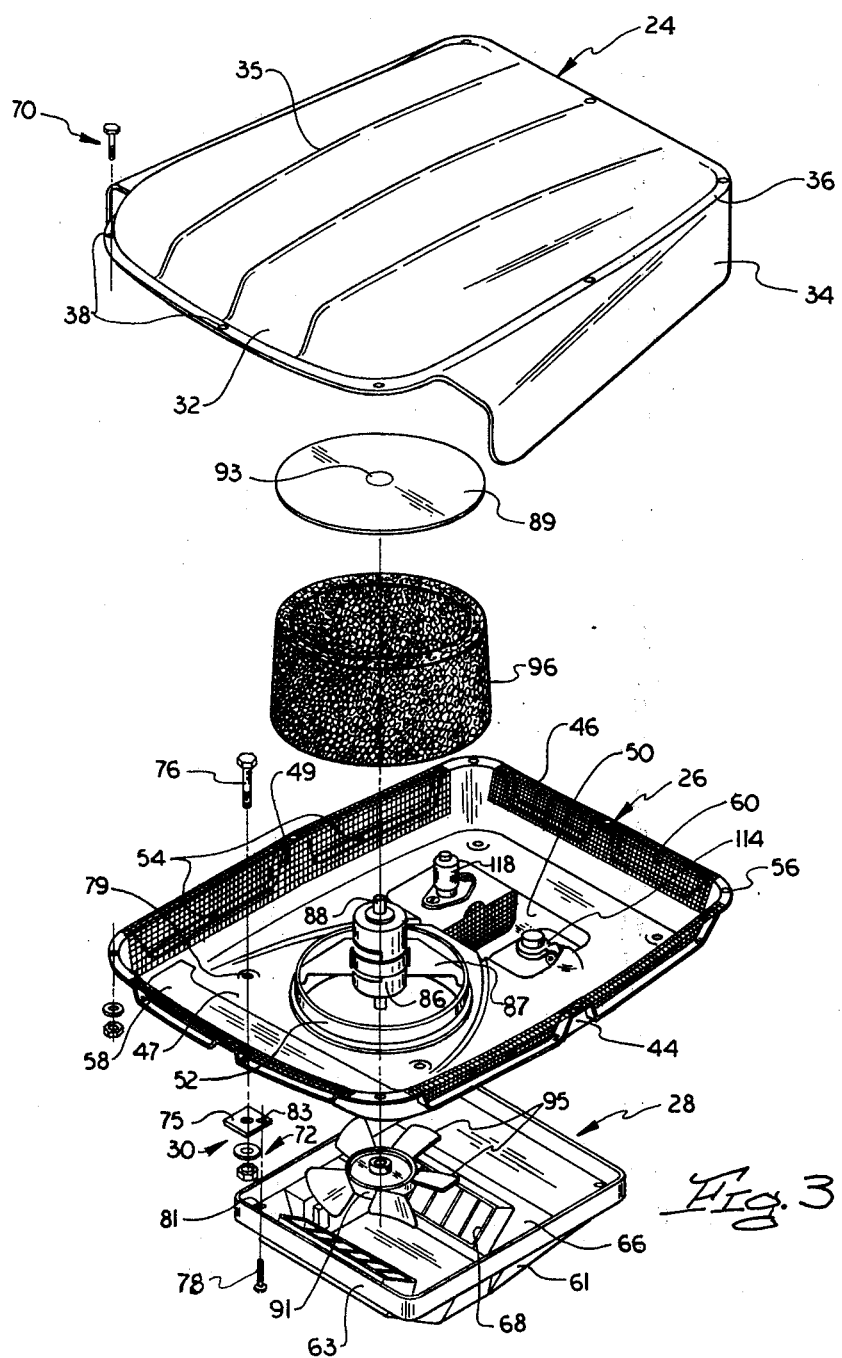
FIG. 3 is an exploded perspective view of the evaporator cooler apparatus of this invention.

The fan housing assembly 28 includes a main body section 61 having about its outer periphery an integral, upright spacer wall 63. The main body section 61 is of an irregular shape having a bottom wall 64, and extended upwardly therefrom, inclined sidewall portions 66. The sidewall portions 66 are formed with a plurality of discharge vents or openings 68 so as to direct the outlet air flow in the desired direction. The discharge openings 68 may have vent members therein for deflecting and guiding the discharged air. The upright spacer wall 63 is adapted to be sealingly engaged with the undersurface of the top wall 14 of the motor vehicle 16 as shown in FIG. 2.

The connector assembly 30 includes 1) a nut, washer, and bolt member indicated generally at 70 to connect the cover member 32 to upper surface 56 of the base housing member 44, and 2) a clamp assembly 72 to secure the support housing assembly 26 and the fan housing assembly 28 to the top wall 14 of the motor vehicle 16 with an insulation ring 74 therebetween.

The clamp assembly 72 (four being used) includes a connector plate 75 mounted against the top wall and first and second bolt members 76, 78. The first bolt member 76 extends through a hole 79 in the bottom wall section 47 of the support housing assembly 26 and threads into the connector plate 75. The second bolt member 78 extends through a hole 81 in the body section 61 and threads into a hole 83 in the connector plate 75 to anchor the fan housing assembly 28 against the top wall 14. It is understood that four of the clamp assemblies 76 are used to provide secure attachment to the vehicle 16.

The vaporizer means 20 includes a power assembly 83 operably associated with a filter assembly 85. The power assembly 83 includes a motor member 86 anchored by a connector bracket 87 to the fan guard 52. The motor member 86 includes a central drive shaft 88 with a vaporizer disc 89 secured to one end and a fan blade 91 secured to the opposite end. The vaporizer disc 89 is of a circular plate shape with a connector hub 93 secured to the center thereof. The connector hub 93 is provided with an opening to receive the upper end of the drive shaft 88 of the motor member 86 and secured in an adjusted position by a set screw. The fan blade 91 is connected to the opposite end of the drive shaft member 88 as by a set screw member and is provided with a plurality, namely five, blade members 95. The blade members 95 are operable to draw air through the support housing assembly 26 for discharge through openings in the fan housing assembly 28 in a manner to be explained.

Figure 4:
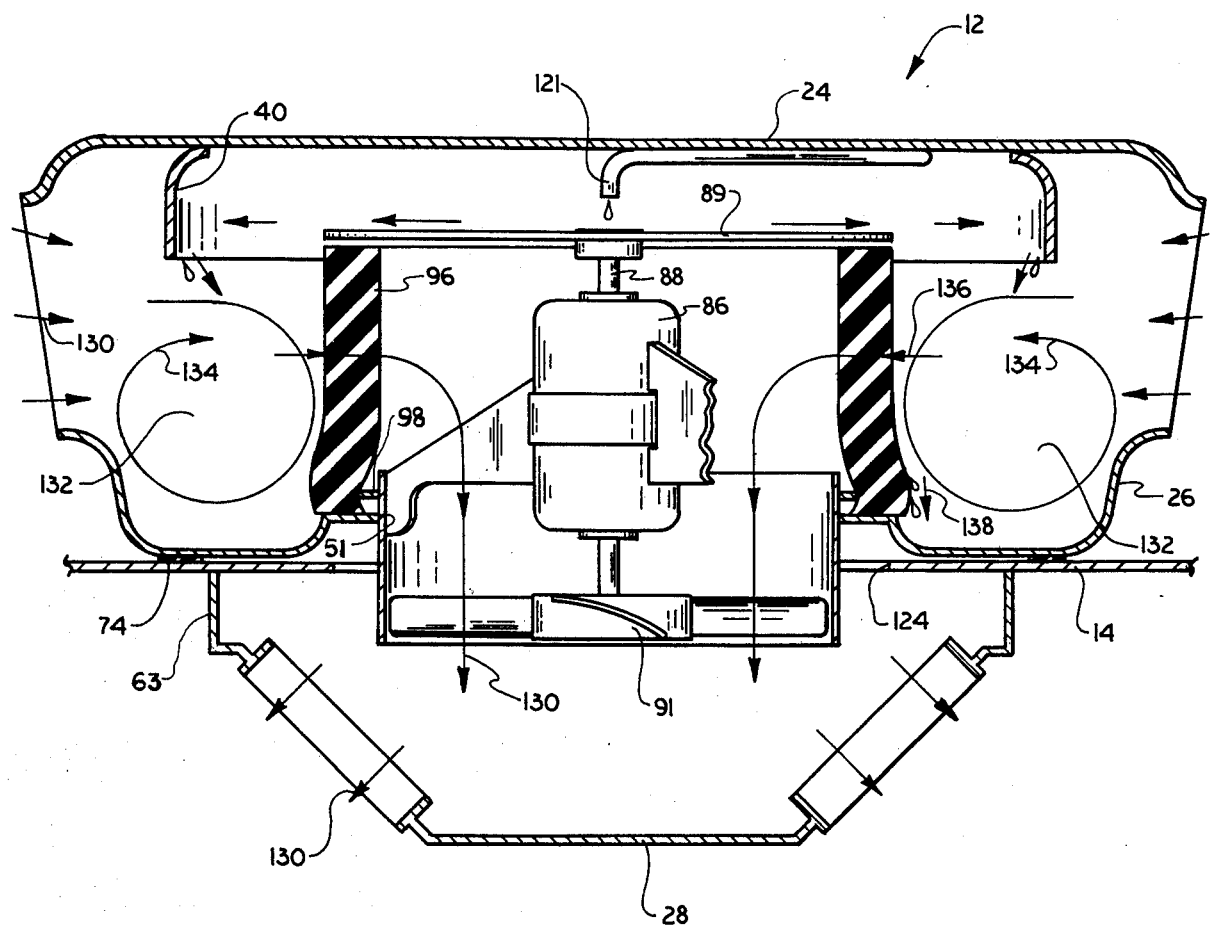
FIG. 4 is a schematic sectional view illustrating the operation of the evaporator cooler apparatus of this invention showing the mixing of the fluid and air particles.

The filter assembly 85 includes a cylindrical filter member 96 of a size to have a lower portion 97 fit snugly about a splash ring 98 which is secured as by welding to the outer upright surface of the fan guard 52. The lower portion 97 of the filter member 96 is biased outwardly by contact with the splash ring 98 as shown in FIG. 4. The outward placing of the filter member 96 prevents any flow of water droplets through the interior of the fan guard 52 so as to prevent water from entering the vehicle 16. It is noted that the diameter of the circular vaporizer disc 89 is substantially identical to the outer diameter of the filter member 96 and placed in close proximity. On rotation of the vaporizer disc 89, an air flow agitation between the vaporizer disc 89 and the filter member 96 prevents water droplets from moving therebetween.

The fluid supply means 22 may be of different types such as (1) a self contained water system serving the entire vehicle, (2) a gravity feed type water supply reservoir to supply the evaporator cooler apparatus, or (3) a self contained pressurized or separate pump reservoir system.

In one preferred embodiment, the fluid supply means 22 includes a reservoir assembly 101 connected to a pump assembly 103 and operable through a control means 105. The reservoir assembly 101, as shown in FIG. 1, includes a reservoir tank member 106 having an outlet through a conduit 108 connected to a filter member 110 and a pump member 111. A conduit member 112 connected to the pump member 111 supplies fluid upwardly to a ball type float valve 114 to maintain a certain fluid level within the reservoir portion 50 of the base housing member 44.

The control means 105 includes an actuator switch (not shown) to energize the motor member 86 and a circulating pump 118 mounted in the reservoir portion 50. The discharge end of the circulating pump 118 is connected by a hose member 119 to a discharge nozzle 121 secured to the cover member 32. The discharge nozzle 121 is curved and operable to discharge water at the center of the vaporizer disc 89 for reasons to become obvious.

In the use and operation of the evaporator cooler apparatus 12 of this invention, it is noted in FIG. 1 that the apparatus can be readily attached to the upper top surface 14 of the motor home vehicle 16 so as to receive the exterior air and cool same for discharge internally of the vehicle 16. More particularly, as shown in FIG. 2, the unit can be easily installed by cutting an opening 124 in the vehicle top wall 14 and placing the interconnected ones of the top housing assembly 24 and support housing assembly 26 thereagainst. Next, the fan housing assembly 28 is placed against the inner surface of the vehicle top wall 14 and secured thereto by the clamp assemblies 72. Next, the float valve 114 is connected to a fluid source so as to maintain a fluid level indicated at 126 within the reservoir portion 50. Next, the control means 105 is connected to a power source to selectively energize the motor member 86 and circulating pump 118.

On referring to FIG. 4, the unique operation and function of this invention is shown by movement of the air and fluid particles. With the power on, fluid is supplied from the reservoir portion 50 through the hose member 119 and discharge nozzle 121 to place the fluid at the center of the vaporizer disc 89. Conjointly, the motor member 89 is energized to rotate the fan member 91 and the vaporizer disc 89. The fan member 91 pulls air inwardly as shown by the arrows 130 through the cut-out portions 54, filter member 96, downwardly into the fan housing assembly 28, and finally through the discharge openings 68.

The water droplets hitting the vaporizer disc 89 receives greater acceleration on moving closer to the outer edge of the vaporizer disc 89 and expelled therefrom at a rapid rate for mixing with the inlet air in a mixing or vortex area indicated at 132. The water droplets hit against the impingement ring member 40 and drop downwardly into direct contact with the inflowing air which achieves a highly efficient mixing in a vortex action as shown by arrows 134. On hitting the impingement ring, the water droplets are broken into very small water particles to aid in forming atomized or fogged water vapor. Therefrom, the combined atomized or fogged water vapor and air is moved, as indicated by arrow 136, through the filter member 96. In case there may be excess moisture, such droplets will move as indicated by arrow 138 downwardly into the reservoir portion 50 and recirculate. The splash ring 98 is designed to maintain any excess water from the inner surface of the filter member 96 within the support housing assembly 26 and not drop downwardly into the fan housing assembly 28.

It is noted that the combination of the inlet air drawn in by the rotating fan blade members 95 and the area of vortex action with the water from the vaporizer disc 89 achieves the overall function of this invention with the air completely atomized before passing through the filter member 96. Under normal conditions, a complete atomization is achieved in the vortex area 132 without any water droplets passing through the filter member 96.

The desired operation is achieved by a combination of (1) the proper amount of water on the vaporizer disc 89; (2) proper rotational speed of the motor member 86 with the resultant speed of the vaporizer disc 89 and fan blades 91; and (3) the proper temperature and humidity of the inlet air before mixing with resultant discharge downwardly through the fan housing assembly 28 into the area to be cooled.

It is seen the evaporator cooler apparatus of this invention presents a streamlined, highly compact unit of durable lightweight construction and which can be readily attached to an upper support wall of a tractor cab, a motor vehicle, campers, pick-up trucks, and the like. The evaporator cooler apparatus is operable in a highly efficient and effective manner to mix inlet air with water particles to achieve an evaporator cooling effect. The evaporator cooler apparatus of this invention is provided with a new and novel vaporizer means having a filter assembly in combination with a power assembly operable to receive fluid such as water and atomize the mixture within the mixing or vortex area in a most efficient and effective manner. Additionally, the evaporator cooler apparatus of this invention provides a structure which is easy to assemble and disassemble; readily accessible for maintenance purposes; and provides a high degree of water atomization relative to the power input required.

While the invention has been described in conjunction with preferred specific embodiments thereof, it will be understood that this description is intended to illustrate and not to limit the scope of the invention, which is defined by the following claims:

I claim:

1. An evaporator cooler apparatus connected to a vehicle, comprising:
   a. a housing means having an annular air inlet section mounted about a central air outlet section;
   b. a vaporizer means mounted in said housing means, an annular mixing chamber area between said vaporizer means and said air inlet section;
   c. A fluid supply means operably connected to said vaporizer means to supply fluid thereto;
   d. said vaporizer means having a power driven, rotatable vaporizer member to receive fluid from said fluid supply means and expell therefrom in fine particles toward said air inlet section and into said mixing chamber;
   e. said vaporizer means having an annular filter member mounted between said air inlet section and said air outlet section; said filter member positioned below and adjacent said vaporizer member;
   f. said mixing chamber positioned outwardly of and positioned about said vaporizer member, and said air inlet section positioned outwardly of said vaporizer member;

whereby air from said inlet section thoroughly mixes with the fine water particles to form a vortex action and achieve complete saturation of the inlet air prior to discharge through said filter member and said air outlet section.

2. An evaporator cooler apparatus as described in claim 1, wherein:
   a. said vaporizer member being a flat disc shape extended in a horizontal plane and operable to receive fluid from said fluid supply means centrally thereof and expel therefrom under centrifugal force in a direction opposite the air flow from said air inlet section for a thorough mixing of the fluid and air in said mixing chamber.

3. An evaporator cooler apparatus as described in claim 1, wherein:
   a. said vaporizer member having a substantial horizontal circular surface;
   b. said annular filter member having a top surface placed adjacent a lower surface of said vaporizer member;
   c. said fluid supply means direct fluid to the axis of said vaporizer member for subsequent lateral movement at increased speed on said horizontal surface for atomization of the fluid and injecting into said mixing chamber to meet inlet air therein from said air inlet section;

whereby the rotation of said vaporizer member prevents the air fluid mixture from moving between said vaporizer member and said filter member and directs the mixture through said filter member.

4. An evaporator cooler apparatus as described in claim 3, wherein:
   a. said housing means having an impingement ring mounted about the periphery of said vaporizer member operable to receive fluid from said vaporizer member thereagainst with the fluid breaking into small particles and then falling to said mixing chamber to initially meet inlet air from said air inlet section for complete atomization and subsequent movement through said filter member.

5. An evaporator cooler apparatus as described in claim 1, wherein:
 a. said housing means having a top housing assembly connected to a support housing assembly, a fan housing assembly connected to said support housing assembly, and an impingement ring mounted about the periphery of said vaporizer member;
 b. said air inlet section between said top housing assembly and said support housing assembly to direct air through said mixing chamber and said filter member to said air outlet section; and
 c. said rotatable vaporizer member having a substantial horizontal surface to receive fluid from said fluid supply means at the vertical axis of said horizontal surface and disperse water particles laterally against said impingement ring and deflected downwardly into said mixing chamber with inlet air moving in an opposite direction of the water particles for complete atomization and said filter member mounted between said vaporizer disc and said air outlet section to filter the airfluid mixture from said mixing chamber before moving into said air outlet section.

* * * * *